April 2, 1963  G. F. ZIFFER  3,084,314
THICKNESS CONTROL SERVOSYSTEM
Filed Aug. 28, 1959
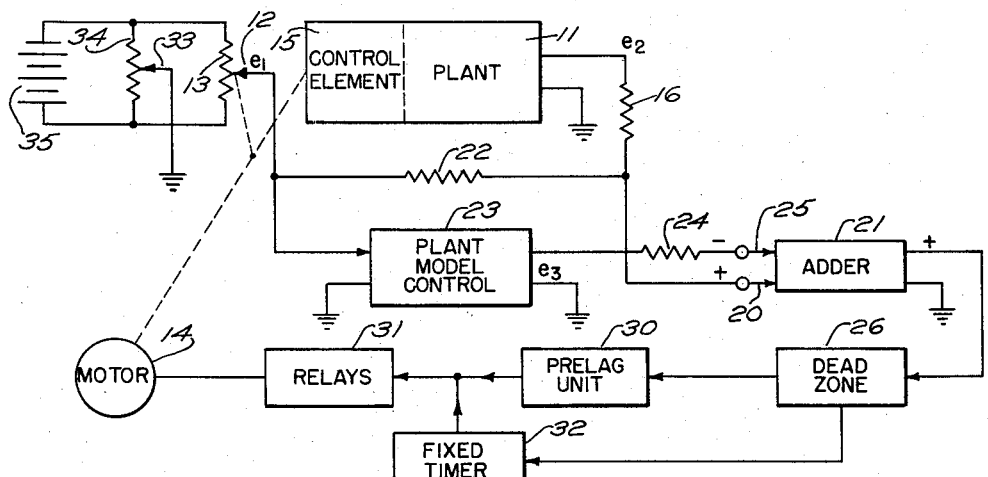
FIG. 1
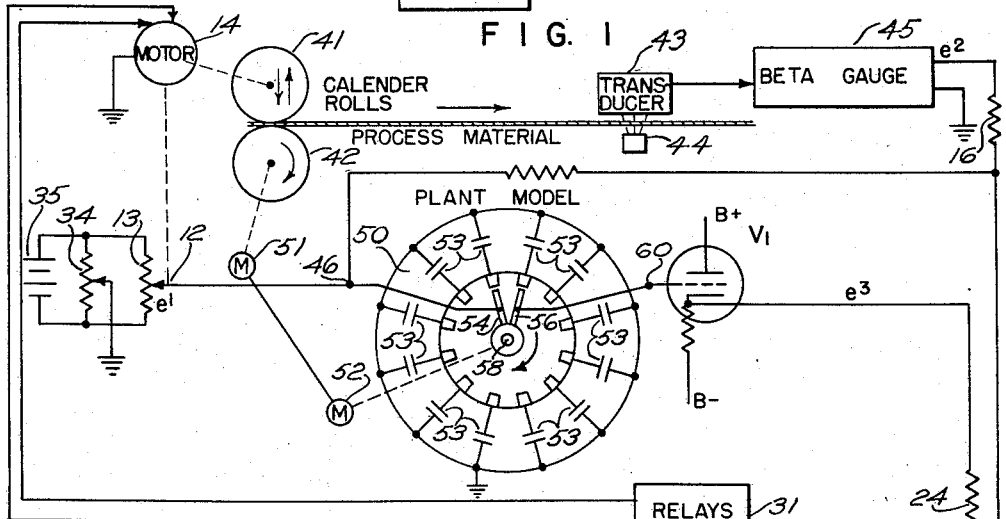
FIG. 2
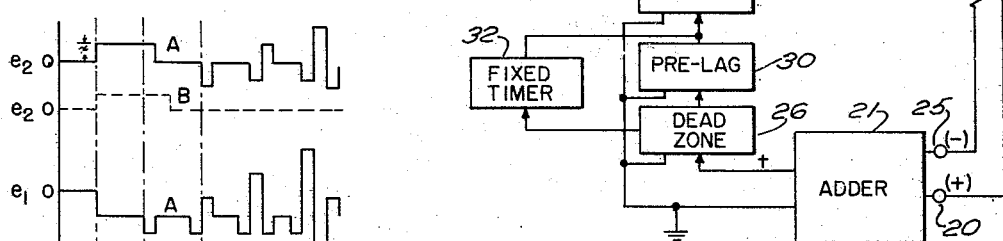
FIG. 3
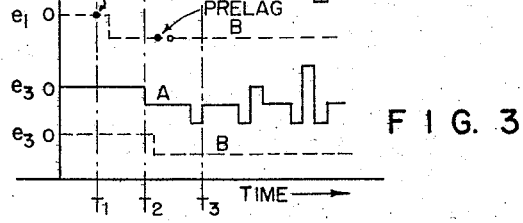
INVENTOR.
GARRET F. ZIFFER
BY
Joseph Weingarten
ATTORNEY ൩,൦൮൪,൩൧൪
THICKNESS CONTROL SERVOSYSTEM
Garret F. Ziffer, Wayland, Mass., assignor, by mesne assignments, to Laboratory for Electronics, Inc., Boston, Mass., a corporation of Delaware
Filed Aug. 28, 1959, Ser. No. 836,724
6 Claims. (Cl. 318—28)

This invention relates in general to automatic process control systems and more particularly to a continuous process control system for operation in conjunction with a plant having inherent transportation delay.

Automatic process control systems have found wide use in manufacturing processes in which some critical parameter of the process must be held within close tolerances in order to have optimum production both in terms of economic feasibility and material specifications. A good example of such manufacturing process is the production of sheet materials such as paper, plastics, rubber and metals. In the production of these products the thickness of the sheet is a critical specification in terms both of a satisfactory material and of the economics of manufacturing. Not only must the thickness be held within close tolerance for purposes of tensile strength, dimensional accuracy and the like, but also due to the continuous nature of the process, running at an increased thickness means a large waste, in terms of economic significance, of the raw material. The function of an automatic process control in this type of manufacture is to measure the critical parameter, for example thickness, and supply this information through a control network to the controlling mechanism to constantly readjust the parameter and maintain it at its optimum value. These automatic control systems ordinarily form a closed loop, including the production plant itself as an integral element of the loop. Other elements within the loop would ordinarily be a transducer sensing element, a correction signal circuit, and a control element. In the operation of such a system the transducer element will sense any variation in the material coming from the process plant and the correction circuit will convert the transducer output into a correction signal, which is in turn applied to the control element to provide an adjustment compensating for the variation of the material.

A severe limitation on the efficient operation of such process control systems arises when there is a "transportation delay" between the control element and the transducer element in the process plant. A transportation delay occurs when there is a time lag between the operation of the control element on the material and the sensing of the resultant change in the material by the transducer. This transportation delay generally occurs when the transducer is physically removed by some distance from the control element and the process material must flow from the control element to the transducer. Thus, in such a process, continuous correction, based on the transducer deviation from some predetermined value, will result in overcorrection at the control element which, when it is sensed at the transducer, will result in another correction in the opposite direction and the whole has an oscillatory tendency. Process control systems to operate under these conditions have been devised. One such system employs a plant model which ideally is constructed to have the same delay as the actual process plant. Both the actual plant and the plant model are assumed to have unity gain. This means in the plant itself that the transducer output signal faithfully reflects the correction signal applied to the control element but occurs at a later time. In this system the correction signal applied to the control element is the difference between the output signal of the plant model and the output signal of the transducer. If, in such a system, the delay of the plant model is exactly matched to the delay of the plant itself, then effective control is achieved. But in practice such a matching of the delays has not proved feasible and when a mismatch occurs between the plant delay and the plant model delay, an oscillating tendency is again introduced.

A second solution to this problem, which has been employed, is the use of an interrupted control rather than a continuous control system. In the interrupted control system a correction signal proportional to the deviation of the material from a predetermined optimum value, as indicated by the transducer, is applied to the control element and then the process control system is interrupted for a period equal to the time lag between the control element and the transducer. Thus in this latter system, after having made a correction, the control element cannot make a second correction until the transducer has had an opportunity to sense the results of the first correction. This system again has provided effective control; however, after making one correction the interruption renders it insensitive for a whole delay period and thus, in a case where two variations spaced closer together than a delay period occur, it requires two full delay periods to make the required corrections.

It is therefore the primary object of the present invention to provide an efficient, stable process control system for operation in conjunction with plants having a transportation delay.

It is another object of the present invention to provide a continuous process control system employing a plant model, which is not dependent on exact matching of plant delay and plant model delay.

It is another object of the present invention to provide a fast-response, non-oscillatory, continuous process control system.

Broadly speaking, the present invention provides a process control system of the plant model type, but which employs a prerecognition circuit, which allows the correction signal to be applied to the control element only if the error exceeds a predetermined magnitude for a predetermined time. The predetermined time element in the prerecognition circuit is set to be in excess of any difference between the delay in the plant model and the delay in the plant itself. As will be described in more detail below, the use of this prerecognition circuit overcomes the oscillatory tendencies derived from the requirement of exact matching of the two delays and, secondarily, prevents the institution of corrections for minor departures of the material from the predetermined optimum, thus reducing excessive wear on the control element mechanical components. These and other objects and advantages will become apparent in the following detailed description when taken in conjunction with the accompanying drawing in which:

FIG. 1 is an illustration in block diagrammatic form of a continuous process control system embodying the principles of this invention;

FIG. 2 is an illustration partly in schematic, and partly in diagrammatic, form of an embodiment of this invention; and FIG. 3 is a graphical illustration of correction signals as a function of time under varying circumstances.

Referring now to FIG. 1 a process control system is shown in which a plant 11 has as the analogue of its input a signal $e_1$, which is the potential on arm 12 of potentiometer 13. The position of arm 12 is determined by a mechanical linkage to motor 14 which drives the mechanical control element 15 to control the process. The analogue of the output of plant 11 is a potential $e_2$, which is indicative of this value of some parameter of the process and which is coupled through resistor 16 to the positive terminal 20 of adder unit 21. The plant input analogue potential $e_1$ is also coupled through resistor 22 directly to the positive terminal 20 of adder 21. This same potential $e_1$ is coupled to the input of plant model control unit 23, the output of which, $e_3$, is coupled through resistor 24 to the negative terminal 25 of adder unit 21. The output of adder unit 21 represents the algebraic sum of $e_1+e_2-e_3$ and this output is provided to the input of dead zone unit 26. The dead zone unit is a circuit which provides an output if, and only if, the magnitude of the input signal exceeds a predetermined amplitude. If this amplitude is exceeded, the dead zone unit output initiates the action of prelag unit 30, which runs for a predetermined time and, if at the expiration of that time the dead zone unit is still providing an output, then prelag unit 30 acts on relay unit 31 which turns on the motor 14 operating control element 15. Motor 14 continues to operate until the adder output signal drops below a sufficient amplitude to provide a dead zone unit output. When this latter point is reached, the dead zone provides a signal to fixed timer 32 which acts on relays 31 to provide actuation for a time which has been calibrated to correspond to the time required for the control element to move from the limit established by the dead zone unit to zero optimum position. The setting of the zero signal optimum position is made by adjusting movable center tap 33 on potentiometer 34 which is coupled in parallel with potentiometer 13 across battery 35.

Considering now the operation of the above described system, a value of the process material is selected as optimum and the position of the control element 15 corresponding to this optimum value determines the position of movable arm 12 on potentiometer 13. (It is apparent that for each value of process material there is a unique position of the control element 15 and hence of arm 12 on potentiometer 13.) By "position of the control element," is meant the condition of this element with respect to its condition at the optimum value. Thus for a screw down motor on a calender roll, the position might be the angular position of the motor shaft, while for a control element which applies heat to a process material, the position might be in terms of total current applied to the control element. The position of arm 33 on potentiometer 34 is then adjusted such that when arm 12 is in the referred to optimum position, the voltage appearing on arm 12 is zero. Hence at this point there is a zero potential at the output of the adder and no control action takes place. If now an external disturbance occurs in the plant which, despite the control element remaining in the position corresponding to a zero potential at $e_1$, causes the process material to vary and hence provides an output at $e_2$, then the magnitude of this output added to the zero $e_1$ will appear on the positive terminal 20 of the adder. The negative terminal of the adder will have zero potential since $e_3$ represents the value of $e_1$ one plant model delay time ago and the output of the adder will then be the same magnitude and direction as the $e_2$ signal itself. If this departure exceeds a predetermined variance from zero which may be preset in the dead zone unit (the choice generally being dictated by what is considered a significant deviation of the process from the zero position), then the dead zone unit provides a signal which starts the timer of the prelag unit 30. Provided that the disturbance remains for a time in excess of the prelag period, the prelag output actuates the relays and the motor 14 is driven in a direction to provide an $e_1$ signal through resistor 22 tending to balance the $e_2$ signal and return the process parameter to its optimum value. When the algebraic sum $e_1+e_2$ differs from zero by an amount equal to the dead zone limit, the actuating signal from the dead zone unit 26 disappears. This starts the fixed timer 32, which has been set to operate the motor 14 through relays 31 for a time sufficient to change $e_1$ by an amount equal to half the width of the dead zone. Since the motor also drives the control element this also institutes a further correction in the process material equal to half the width of the dead zone. When the fixed timer 32 times out $e_1+e_2=0$.

The importance of the prelag unit in the system can best be seen by referring to FIG. 3 which is a graphical illustration of the interdepending variation of the signals $e_1$, $e_2$ and $e_3$ as a function of time when a disturbance has been created. It is assumed that the delay time of the plant, $\tau_p$, is equivalent to five units on the graph, whereas the delay of the plant model, $\tau_m$, is equivalent to four units on the graph. Further, the prelag time is made to exceed any discrepancy which might exist between these delays and in this case is predicated as one unit. The A curves depict the response when there is no prelag unit in operation, while the B curves illustrate the response with the prelag unit. Referring now to the A curve, without prelag, a disturbance at time $T_1$ effects a change X in the $e_2$ output. This would be immediately reflected through correction as a change $-X$ in $e_1$ and there would be no change at this time in $e_3$ since it is a delayed signal. Thus immediately following $T_1$ the system is again in balance and remains that way for four units of time, at the end of which the variation in $e_1$ appears now in $e_3$ and this throws the system out of balance, although there is no change in $e_2$, and $e_1$ accordingly is driven to balance the $e_3$ imbalance at time $T_2$ and again the system is in balance. One unit of time later, however, represents five units after $T_1$ and hence the initial correction effective at time $T_1$ is represented in the plant output $e_2$ and it returns to its initial level, again creating an imbalance since $e_3$ is offset from the zero position. The correction signal then is applied to bring $e_1$ up to the position where it balances out $e_2$ again, creating a new equilibrium. At time $T_3$ the negative change in $e_1$ effected at time $T_2$ is reflected in a negative change in $e_2$, which causes $e_1$ to be driven in the opposite direction at time $T_3$; but also at $T_3$ the signal $e_3$ undergoes a step increase reflecting the positive change that took place in $e_1$ four time units ago, the result being that in order to create balance $e_1$ rises by a distance of 2X before equilibrium is achieved. As can be seen from the graph, from this point in time on the oscillation of $e_1$ and hence the oscillations of $e_2$ and $e_3$ begin to increase in amplitude and the control system is rendered ineffective. Contrasting the A curves with the B curves, the latter representing the continuous control system employing the prelag unit, it is seen that the disturbance causes $e_2$ to become positive at time $T_1$, as in the previous case. Although this creates an immediate imbalance, the effect of the prelag unit is to prevent any action in $e_1$ until the prelag time has run out so that $e_1$ only undergoes a change one time unit after $e_2$ has changed. Four time units later, which represents the delay in $e_3$, the downward change in $e_1$ is reflected in $e_3$; however, no action is initiated until the prelag time has again run out. In this case by the time the prelag duration has elapsed the effect of the correction is reflected in the $e_2$ signal which has returned to the zero point, and the $-X$ level of $e_1$ balances out the $-X$ level of $e_3$ and the system remains in equilibrium. It is thus seen that in this latter system, if the prelag time is set to exceed any possible discrepancy between the plant delay and the plant model delay, a completely stable system, which can achieve the correction in a time equal to the plant delay plus one prelag period, has been achieved. The prelag correction will of course be equally effective if the discrepancy arises from the model delay $\tau_m$ exceeding the plant delay $\tau_p$.

With reference now to FIG. 2 a more detailed illustration of a specific embodiment of this invention is shown. In this figure like numbers refer to like parts of the previous figure. In this embodiment, the parameter being controlled is the thickness of process material 40 which is seen to flow from calender rolls 41 and 42 in the direction of beta gauge transducer 43. The thickness is controlled by the action of calender roll 41, the vertical position of which is determined by screwdown motor 14, thus varying the gap between calender roll 42 and roll 41. The thickness of the material is measured by the beta gauge transducer 43 and source 44 combination, which provides a current, varying in accordance with the thickness, to beta gauge unit 45. The beta gauge unit 45 converts the current from the transducer to a voltage signal corresponding in magnitude to the input voltage $e_1$. The development of a signal $e_2$ of corresponding magnitude to signal $e_1$ is generally accomplished by providing a bridge circuit within the beta gauge similar to that formed by the elements 34 and 13 and, in this case, the position of the potentiometer arm representing the output of the beta gauge is determined by mechanically linking it to an arm (not shown) which follows the excursion of transducer current. In this embodiment the output $e_2$ is again supplied through resistor 16 to the positive terminal of an adder unit 21. The potential $e_1$ is determined by the position of arm 12 of potentiometer 13 which is controlled by motor 14 so that it follows the vertical motion of calender roll 41. The signal $e_1$ is supplied through resistor 22 to the positive terminal of the adder unit 21, as well as being supplied to the input terminal 46 of plant model 50.

As previously described, the function of the plant model is to provide an output signal $e_2$, opposite in polarity and corresponding in magnitude to its input signal, and occurring after a delay which is as nearly as possible equal to the delay in the plant itself. Referring to FIG. 2 the delay in the plant is the time required for the process material to flow from the calender rolls 41 and 42 to the transducer source combination 43 and 44. The clockwise rotation of calender roll 42 controls the speed of this flow and this rotation is in itself determined by selsyn motor 51. This motor 51 is electrically coupled to a second selsyn motor 52, the arrangement being such that the speed of the second motor 52 follows the speed of the primary selsyn motor 51. The plant model itself consists of a series of capacitors 53, disposed in a circle and each having one side grounded. The other terminals of each of the capacitors are insulatedly supported in a second circle of smaller diameter such that each capacitor is electrically independent of all of the others. A contact arm 54, electrically coupled to input terminal 46, and a second contact arm 56, electrically coupled to output terminal 60, are insulatedly supported on rotating center shaft 58. Arms 54 and 56 are so spaced that when one arm is contacting the terminal of one capacitor the other arm contacts the terminal of the next adjacent capacitor. The second selsyn motor 52 is mechanically coupled to shaft 58 and drives the shaft, then, at the same speed with which calendar roll 42 is being rotated. The circumference of the inner circle on which the contact points for the capacitors lie is arranged such that each of the arms 54 and 56 complete one revolution in the same time that is required for the process material to flow from the calender roll to the transducer. The operation then is one of digital memory, in that each capacitor is charged by the input arm to the level at which $e_1$ is at the time of contact, and one full delay time later the output arm 56 applies this same potential to the output terminal 60. The output terminal 60 is the grid of a triode V–1 which serves to invert the polarity of the signal thus providing that $e_3$ is of opposite polarity to its corresponding $e_1$ potential.

The operation of the adder is as described in the previous section and it supplies an output signal representing the algebraic sum of $e_2-e_3+e_1$ to the dead zone unit 26. The dead zone unit 26 may be any circuit capable of recognizing magnitude and polarity of signals and providing an output to the prelag unit 30 when the magnitude exceeds a predetermined level in either direction and also including in this signal an indication of the polarity. As before, the prelag unit operates for a preset time, sufficient to overcome any discrepancies between the delay time of the plant model and that of the actual plant. At the expiration of this prelag period, if the dead zone preset limit is still being exceeded, the prelag unit provides an actuating signal to relay unit 31. Relay unit 31 would ordinarily consist of two relays, one being actuated at the expiration of the prelag time if the dead zone limit was exceeded in one polarity, and the other being actuated if the dead zone limit was exceeded in the opposite polarity; one relay driving motor 14 in one direction whereas the other relay would drive motor 14 in the opposite direction.

While the process control system of this invention has been discussed in terms of a beta gauge transducer, calender roll, and sheet process material, it would apply equally well to any process in which it is desired to maintain a critical parameter within close tolerances and in which a transportation delay exists between the effecting of control and the sensing of the resultant change in the material. Again the plant model has been described in terms of a particular digital configuration, but the invention herein contemplates the use of any plant model which provides as its output the correction signal $e_1$ in reverse polarity after a delay substantially equivalent to the delay in the plant itself. It will be understood that numerous modifications and departures may now be made by those skilled in this art, and the invention herein is to be construed as limited only by the spirit and scope of the appended claims.

What is claimed is:

1. Control apparatus comprising a transducer member adapted to provide a signal in accordance with changes in a variable to be controlled; a control element adapted to effect changes in said variable in response to a correction signal; means providing a signal indicative of the position of said control element; memory means adapted to provide as an output the said position indicative signal after a predetermined time lapse, said predetermined time lapse having a duration approximately equal to any time delay between operation of said control element upon said variable to be controlled and the sensing of the effect of said operation at said transducer element; means adapted to provide as a correction signal a signal related in value to the combination of said position indicative, transducer and memory signals; means for applying said correction signal to said control element, means for inhibiting application of said correction signal to said control element unless said correction signal exceeds a predetermined value for a predetermined time, said predetermined time being in excess of any discrepancy between the duration of said memory means time lapse and said time delay between operation of said control element and said sensing of the effect at said transducer.

2. Control apparatus comprising a transducer member adapted to provide a signal in accordance with changes in a variable to be controlled; a control element adapted to effect changes in said variable in response to a correction signal; means providing a signal indicative of the position of said control element; memory means adapted to provide as an output the said position indicative signal after a predetermined time lapse, said predetermined time lapse having a duration in excess of any time delay between operation of said control element upon said variable to be controlled and the sensing of the effect of said operation at said transducer element; means for providing a correction signal to said control element adapted to provide as a correction signal the sum of said position indicative signal and said transducer signal less said memory signal; means for inhibiting application of said correction signal to said control element unless said correction signal exceeds a predetermined value for a predetermined time.

3. Control apparatus comprising a transducer member adapted to provide a signal in accordance with changes in a variable to be controlled; a control element adapted to effect changes in said variable in response to a correction signal; means adapted to provide a signal indicative of the position of said control element; memory means adapted to provide as an output the said position indicative signal after a predetermined time lapse, said time lapse having a duration in excess of any time delay between the operation of said control element on said variable to be controlled and the detection of the effect of said operation at said transducer element; means for providing a correction signal adapted to provide as a correction signal the sum of said position indicative signal and said transducer signal less said memory signal; limit recognition means adapted to provide an output signal of one polarity when said correction signal exceeds a predetermined value in one direction and to provide an output signal of the opposite polarity when said correction signal exceeds a predetermined value in the opposite direction; timer means responsive to a signal from said limit recognition means and adapted to inhibit for a predetermined time the signal from said limit recognition means from operating said control element, said predetermined time being fixed to be in excess of any discrepancy between the actual time delay between said transducer detection of the effect of operation of said control element and the operation of said control element and said memory element time lapse.

4. Apparatus in accordance with claim 3 having a zeroing element acting in response to decrease of said correction signal to a value less than said predetermined value in said limit recognition means and adapted to continue the operation of said control element for a period sufficient to return said control element to a position corresponding to a zero correction signal.

5. Apparatus in accordance with claim 2 wherein said memory means comprises, a plurality of capacitors; a first movable contact electrically coupled to said position indicative signal means; a second movable contact electrically coupled to said correction signal means, said movable contacts adapted to sequentially contact one terminal of each of said plurality of capacitors in a manner whereby said second contact precedes said first contact, the frequency of said contacting being related to the time lapse between the operation of said control element and the detection of the effect of said operation at said transducer means, whereby information as to the position of said control element is supplied to said correction signal means with a time delay related to the delay between said control element operation and said transducer detection.

6. Control apparatus comprising a radioactive thickness gage transducer adapted to provide a signal in accordance with changes in thickness of a material to be controlled; a control element adapted to effect changes in thickness in said material in response to a correction signal; means coupled to said control element for providing a signal indicative of the position of said control element; memory means adapted to provide as an output said position indicative signal after a predetermined time lapse, said time lapse having a duration in excess of any time delay between the operation of said control element and the sensing of the effective change in thickness of said material at said radioactive thickness gage; means for providing a correction signal to said control element, adapted to provide as an output a signal representing the sum of said position indicative signal and said radioactive gage signal less said memory signal; means adapted to provide said correction signal to said control element only when said correction signal exceeds a predetermined value for a predetermined time.

References Cited in the file of this patent
UNITED STATES PATENTS

| | | |
|---|---|---|
| 2,727,194 | Seid | Dec. 13, 1955 |
| 2,737,186 | Molins et al. | Mar. 6, 1956 |
| 2,750,986 | Russell et al. | June 19, 1956 |
| 2,785,368 | Elliot | Mar. 12, 1957 |
| 2,793,345 | Hags | May 21, 1957 |
| 2,829,268 | Chope | Apr. 1, 1958 |
| 2,862,167 | Curry | Nov. 27, 1958 |
| 3,010,018 | Ziffer | Nov. 21, 1961 |

OTHER REFERENCES

"Automatic Control Terminology," 1954 edition, published by A.S.M.E., New York, 1954.